(12) United States Patent
Kano et al.

(10) Patent No.: US 10,421,864 B2
(45) Date of Patent: *Sep. 24, 2019

(54) METAL SURFACE PROCESSING AGENT

(71) Applicant: NOK Corporation, Tokyo (JP)

(72) Inventors: Taichi Kano, Kanagawa (JP);
Tomohiro Kaise, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/431,265

(22) PCT Filed: Nov. 29, 2013

(86) PCT No.: PCT/JP2013/082232
§ 371 (c)(1),
(2) Date: Mar. 25, 2015

(87) PCT Pub. No.: WO2014/087939
PCT Pub. Date: Jun. 12, 2014

(65) Prior Publication Data
US 2015/0274989 A1    Oct. 1, 2015

(30) Foreign Application Priority Data

Dec. 4, 2012  (JP) ................. 2012-265697

(51) Int. Cl.
| | | |
|---|---|---|
| C23C 22/02 | (2006.01) | |
| C09D 1/04 | (2006.01) | |
| C08K 3/36 | (2006.01) | |
| C08K 5/56 | (2006.01) | |
| C08J 5/12 | (2006.01) | |
| C09D 7/20 | (2018.01) | |
| C09D 7/43 | (2018.01) | |
| C09J 7/20 | (2018.01) | |

(52) U.S. Cl.
CPC .................. C09D 1/04 (2013.01); C08J 5/12 (2013.01); C08K 3/36 (2013.01); C08K 5/56 (2013.01); C09D 7/20 (2018.01); C09D 7/43 (2018.01); C09J 7/20 (2018.01); C23C 22/02 (2013.01); C09J 2205/306 (2013.01); C09J 2400/163 (2013.01); C09J 2400/166 (2013.01); C09J 2421/006 (2013.01)

(58) Field of Classification Search
None
See application file for complete search history.

(56) References Cited

U.S. PATENT DOCUMENTS

| | | | | |
|---|---|---|---|---|
| 2006/0157350 A1* | 7/2006 | Williamson | ............ | C08L 67/02 204/471 |
| 2006/0169183 A1 | 8/2006 | Waser | | |
| 2010/0190018 A1 | 7/2010 | Higashira et al. | | |

FOREIGN PATENT DOCUMENTS

| | | | |
|---|---|---|---|
| EP | 2 174 723 A1 | 4/2010 | |
| JP | 01-163278 A | 6/1989 | |
| JP | 734054 | 2/1995 | |
| JP | 7216309 | 8/1995 | |
| JP | 8209102 | 8/1996 | |
| JP | 93432 | 1/1997 | |
| JP | 940916 | 2/1997 | |
| JP | 9132758 | 5/1997 | |
| JP | 107990 | 1/1998 | |
| JP | 108021 | 1/1998 | |
| JP | 111672 | 1/1999 | |
| JP | 11221875 | 8/1999 | |
| JP | 20006307 | 1/2000 | |
| JP | 2001226642 | 8/2001 | |
| JP | 2002-167544 A | 6/2002 | |
| JP | 2003-164801 A | 6/2003 | |
| JP | 2005179769 | 7/2005 | |
| JP | 2005-249031 A | 9/2005 | |
| JP | 2006-056015 A | 3/2006 | |
| JP | 2006-187679 A | 7/2006 | |

OTHER PUBLICATIONS

Traslation of JP 2006-056015.*
International Search Report and Written Opinion for corresponding International Application No. PCT/JP2013/082232 dated Mar. 4, 2014 and English translation.
International Preliminary Report on Patentability for corresponding International Application No. PCT/JP2013/082232 dated Jun. 9, 2015.
Extended European Search Report dated Aug. 2, 2016 for corresponding European Application No. 13860000.2.
Notification of Reason for Refusal dated Nov. 14, 2017 for corresponding Japanese Application No. 2014-551076 and English translation.
Office Action dated Jan. 19, 2017 for co-pending U.S. Appl. No. 15/296,900, filed Oct. 18, 2016.
Final Office Action dated Jul. 18, 2017 for co-pending U.S. Appl. No. 15/296,900, filed Oct. 18, 2016.
Office Action dated Dec. 6, 2017 for co-pending U.S. Appl. No. 15/296,900, filed Oct. 18, 2016.
Final Office Action dated Jul. 2, 2018 for co-pending U.S. Appl. No. 15/296,900, filed Oct. 18, 2016.
Notice of Allowance dated Oct. 29, 2018 for co-pending U.S. Appl. No. 15/296,900, filed Oct. 18, 2016.

* cited by examiner

*Primary Examiner* — Yun Qian
(74) *Attorney, Agent, or Firm* — Pearne & Gordon LLP

(57) ABSTRACT

An object is to provide a metal surface treatment agent which can be coated by screen printing, and can be effectively used for metal surface treatment at the time of forming a rubber-metal complex excellent in water resistance and heat resistance, and the object can be solved by a metal surface treatment agent which comprises an organometallic compound, silica, magnesium silicate hydrate, and an organic solvent represented by the following general formula (I):

$$R-O-(CH_2)_2OH \quad \text{General formula (I)}$$

[wherein R represents an alkyl group having 3 or more carbon atoms or an aryl group.]

5 Claims, No Drawings

METAL SURFACE PROCESSING AGENT

TECHNICAL FIELD

The present invention relates to a metal surface treatment agent, more specifically to a metal surface treatment agent which can coat by means of screen printing and can be effectively used mainly for surface treatment of metal to form a rubber-metal composite with excellent water resistance and heat resistance.

BACKGROUND ART

As a metal material of a rubber-metal complex such as oil seal, gasket, diaphragm, valves, etc., which are required to have water resistance, LLC (long life coolant) resistance and heat resistance, a stainless steel has been mainly used.

Even when a rubber metal laminated plate is tried to be prepared by directly applying a vulcanizing adhesive to stainless steel and adhering rubber thereto, there is a problem that liquid resistant adhesion durability is poor. Also, when a dipping test of this rubber metal laminated plate is carried out by using water, LLC, etc., there is a problem that it causes adhesion peel.

To solve the above problems, the applicant of the present invention has previously proposed that a coating type chromate treatment is applied on a stainless steel as a pre-treatment before coating with a vulcanizing adhesive, whereby resistances to water, LLC, etc., are improved (Patent Document 1, Patent Document 2).

However, according to the coating type chromate treatment, $Cr^{6+}$ ion is contained therein so that it is not preferred for environmental reasons.

To the contrary, various kinds of undercoating agents for a vulcanizing adhesive comprising a phenol series resin as a base material have been commercially available.

However, such an undercoating agent does not show sufficient adhesiveness and water resistance with regard to adhesion with stainless steel.

Thus, the applicant of the present invention has further proposed various vulcanizing adhesive compositions comprising an alkoxysilane as an adhesive of a metal and rubber for manufacturing a rubber-metal complex.

These vulcanizing adhesive compositions are particularly suitable for adhesion of a metal surface which has been subjected to a chemical or physical surface treatment in advance, but when they are applied to a non-treated metal surface, as much adhesion as a surface treated metal cannot be obtained, an example of which is stainless steel treated with coating type chromate.

Also, in an actual use environment, there are many cases in which different kinds of metals are contacted to each other simultaneously in the state of dipping in the same solution. In such a case, an electrical potential is generated between the stainless steel plate which forms a rubber metal laminate and the different kind of the metal contacting thereto, and a phenomenon can be seen that adhesion peeling or generation of blister (bubble) is promoted (Patent Documents 3 to 12).

To solve these problems, it has been proposed to use a metal surface treatment agent containing an organometallic compound and silica (Patent Document 13).

PRIOR ART DOCUMENT

Patent Documents

Patent Document 1: JP-A-2000-006307A
Patent Document 2: JP-A-H11-221875A
Patent Document 3: JP-A-H7-34054A
Patent Document 4: JP-A-H7-216309A
Patent Document 5: JP-A-H8-209102A
Patent Document 6: JP-A-H9-3432A
Patent Document 7: JP-A-H9-40916A
Patent Document 8: JP-A-H9-132758A
Patent Document 9: JP-A-H10-7990A
Patent Document 10: JP-A-H10-8021A
Patent Document 11: JP-A-H11-1672A
Patent Document 12: JP-A-2001-226642A
Patent Document 13: JP-A-2005-179769A

SUMMARY OF THE INVENTION

Problems to be Solved by the Invention

However, in these metal surface treatment agents, their viscosities are low as 10 mPa·s, so that the means to coat them to a metal are limited only to dipping, spraying, brush coating, roll coating, etc. It is extremely difficult to partially coat the metal surface by these means, while screen printing enables partial coating.

Coating by a screen printing machine cannot be done when blur or hang down is generated on a plate, or a viscosity does not fall in a certain value.

The present inventor has found that, when an organic solvent such as methyl ethyl ketone, isopropyl alcohol, methanol, etc., is used as a solvent in the metal surface treatment agent, blur or hang down on a plate, or increase in a viscosity of the agent is generated.

Thus, the present inventor has found that magnesium silicate hydrate as a thickener and a specific organic solvent represented by general formula (I) $R-O-(CH_2)_2OH$ are contained in a metal surface treatment agent containing an organometallic compound and silica, coating by the screen printing can be realized, whereby he has accomplished the present invention.

Accordingly, an object of the present invention is to provide a metal surface treatment agent which can be coated by screen printing and can be effectively used for the metal surface treatment at the time of forming a rubber-metal complex excellent in water resistance and heat resistance.

Also, the other problems of the present invention would be clarified by the following descriptions.

Means to Solve the Problems

The above-mentioned problems are solved by the following respective inventions.

1. A metal surface treatment agent which comprises an organometallic compound, silica, magnesium silicate hydrate and an organic solvent represented by the following general formula (I):
and the magnesium silicate hydrate is an organic modified magnesium silicate, and the organic modified magnesium silicate comprises 4 to 19% by weight; General formula (I)

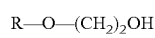

wherein R represents an alkyl group having 3 or more carbon atoms or an aryl group.

2. A metal surface treatment agent which comprises an organometallic compound, silica, magnesium silicate hydrate and an organic solvent represented by the following general formula (I):

and the magnesium silicate hydrate is a non-modified magnesium silicate, and the non-modified magnesium silicate comprises 6 to 19% by weight;

R—O—(CH$_2$)$_2$OH    General formula (I)

wherein R represents an alkyl group having 3 or more carbon atoms or an aryl group.

3. The metal surface treatment agent according to 1 or 2, wherein solid content concentrations of the organometallic compound and the silica are both 0.01 to 20% by weight.

4. The metal surface treatment agent according to any one of 1 to 3, wherein the solid content concentration of the metal surface treatment agent is 4 to 35% by weight.

5. The metal surface treatment agent according to any one of 1 to 4, wherein a viscosity at room temperature of 25° C. by a B type viscometer at 60 rpm is 100 mPa·s or more.

6. The metal surface treatment agent according to any one of 1 to 5, wherein a ratio $V_6/V_{60}$ which is a viscosity $V_6$ at 6 rpm to a viscosity $V_{60}$ at 60 rpm is in the range of 2 to 10.

7. Use of the metal surface treatment agent according to any one of 1 to 6 as a metal surface treatment agent for the manufacture of a rubber-metal complex.

Effects of the Invention

The metal surface treatment agent of the present invention is excellent in water resistance and heat resistance, and by using the metal surface treatment agent, excellent adhesiveness is shown and it can be effectively used for the metal surface treatment, etc., at the time of forming a rubber-metal complex.

The metal surface treatment agent of the present invention can be partially coated by screen printing, and neither bleeding, hang down at the time of coating, nor bubble after coating is generated.

EMBODIMENTS TO CARRY OUT THE INVENTION

In the following, embodiments of the present invention are explained.

The metal surface treatment agent of the present invention contains (a) an organometallic compound, (b) silica, (c) magnesium silicate hydrate as a thickener, and (d) a specific organic solvent represented by the general formula (I) R—O—(CH$_2$)$_2$OH (hereinafter referred to "the organic solvent of the present invention", if necessary).

The organometallic compound may be exemplified by the following compounds.

(1) An organoaluminum compound such as triisopropoxy aluminum, mono-sec-butoxydipropoxy aluminum, tri-sec-butoxy aluminum, tri(2-ethylhexyl) aluminum, diisopropoxy aluminum mono(methylacetoacetate), diisopropoxy aluminum mono(ethylacetoacetate), diisopropoxy aluminum mono(propylacetoacetate), diisopropoxy aluminum mono(butylacetoacetate), diisopropoxy aluminum mono(hexylacetoacetate), di-n-propoxy aluminum mono(methylacetoacetate), di-n-propoxy aluminum mono(ethylacetoacetate), di-n-propoxy aluminum mono(propylacetoacetate), di-n-propoxy aluminum mono(butylacetoacetate), di-n-propoxy aluminum mono(hexylacetoacetate), dibutoxy aluminum mono(methylacetoacetate), dibutoxy aluminum mono(ethylacetoacetate), dibutoxy aluminum mono-(propylacetoacetate), dibutoxy aluminum mono(butylacetoacetate), dibutoxy aluminum mono(hexylacetoacetate), aluminum tris(ethylacetoacetate), aluminum tris(propylacetoacetate), aluminum tris(butylacetoacetate), aluminum tris(hexylacetoacetate), aluminum monoacetylacetonate-bis(ethylacetoacetate), aluminum tris(acetylacetonate), diisopropoxy aluminum mono(acetylacetonate), etc.;

(2) an organotitanium compound such as tetra-i-propoxy titanium, tetra-n-propoxy titanium, tetra-n-butoxy titanium, tetra(2-ethylhexyl)titanate, diisopropoxy titanium bis(methylacetoacetate), diisopropoxy titanium bis(ethylacetoacetate), diisopropoxy titanium bis(propylacetoacetate), diisopropoxy titanium bis(butylacetoacetate), diisopropoxy titanium bis(hexylacetoacetate), di-n-propoxy titanium bis(methylacetoacetate), di-n-propoxy titanium bis(ethylacetoacetate), dipropoxy titanium bis(propylacetoacetate), di-n-propoxy titanium bis(butylacetoacetate), di-n-propoxy titanium bis(hexylacetoacetate), di-n-butoxy titanium bis(methylacetoacetate), di-n-butoxy titanium bis(ethylacetoacetate), di-n-butoxy titanium bis(propylacetoacetate), di-n-butoxy titanium bis(butylacetoacetate), di-n-butoxy titanium bis(hexylacetoacetate), 1,3-propanedioxy titanium bis(ethylacetoacetate), diisopropoxy titanium bis(acetylacetonate), di-n-propoxy titanium bis(acetylacetonate), di-n-butoxy titanium bis(acetylacetonate), titanium tetraacetylacetonate, titanium tetraethylacetoacetate, titanium tetrapropylacetoacetate, titanium tetrabutylacetoacetate, etc.;

(3) an organozirconium compound such as tetra-i-propoxy zirconium, tetra-n-propoxy zirconium, tetra-n-butoxy zirconium, diisopropoxy zirconium bis(methylacetoacetate), diisopropoxy zirconium bis(ethylacetoacetate), diisopropoxy zirconium bis(propylacetoacetate), diisopropoxy zirconium bis(butylacetoacetate), diisopropoxy zirconium bis(hexylacetoacetate), di-n-propoxy zirconium bis(methylacetoacetate), di-n-propoxy zirconium bis(ethylacetoacetate), di-n-propoxy zirconium bis(propylacetoacetate), di-n-propoxy zirconium bis(butylacetoacetate), di-n-propoxy zirconium bis(hexylacetoacetate), di-n-butoxy zirconium bis(methylacetoacetate), di-n-butoxy zirconium bis(ethylacetoacetate), di-n-butoxy zirconium bis(propylacetoacetate), di-n-butoxy zirconium bis(butylacetoacetate), di-n-butoxy zirconium bis(hexylacetoacetate), 1,3-propanedioxyzirconium bis(ethylacetoacetate), diisopropoxy zirconium bis(acetylacetonate), di-n-propoxy zirconium bis(acetylacetonate), di-n-butoxy zirconium bis(acetylacetonate), zirconium tetraacetylacetonate, zirconium tetraethylacetoacetate, zirconium tetrapropylacetoacetate, zirconium tetrabutylacetoacetate, etc.; and an organotin compound such as tetra-i-propoxy tin, tetra-n-propoxy tin, tetra-n-butoxy tin, diisopropoxy tin bis(methylacetoacetate), diisopropoxy tin bis(ethylacetoacetate), diisopropoxy tin bis(propylacetoacetate), diisopropoxy tin bis(butylacetoacetate), diisopropoxy tin bis(hexylacetoacetate), di-n-propoxy tin bis(methylacetoacetate), di-n-propoxy tin bis(ethylacetoacetate), di-n-propoxy tin bis(propylacetoacetate), di-n-propoxy tin bis(butylacetoacetate), di-n-propoxy tin bis(hexylacetoacetate), di-n-butoxy tin bis(methylacetoacetate), di-n-butoxy tin bis(ethylacetoacetate), di-n-butoxy tin bis(propylacetoacetate), di-n-butoxy tin bis(butylacetoacetate), di-n-butoxy tin bis(hexylacetoacetate), 1,3-propanedioxy tin bis(ethylacetoacetate), diisopropoxy tin bis(acetylacetonate), di-n-propoxy tin bis(acetylacetonate), di-n-butoxy tin bis(acetylacetonate), tin tetraacetylacetonate, tin tetraethylacetoacetate, tin tetrapropylacetoacetate, tin tetrabutylacetoacetate, dibutyl tin dilaurate, dibutyl tin dioctate, dioctyl tin dilaurate, etc.

Among the above-mentioned organometallic compounds, an organotitanium compound is preferably used.

In addition, among the organotitanium compounds, a titanium chelate compound such as titanium tetraacetylacetonate, etc., is further preferably used.

The organotitanium compound to be preferably used in the present invention can be obtained as a commercially available product, and the commercially available product may be "TC-401" available from Matsumoto Fine Chemical Co., Ltd., etc.

The silica to be used is a material in which dry or wet silica with the $SiO_2$ content of 85% or more is dispersed in an organic solvent or in water, preferably the so-called colloidal silica in which high purity anhydrous silica fine particles are dispersed in an organic solvent or in water to make a colloidal state.

As the colloidal silica, a material having an average particle size of preferably 1 to 50 nm, more preferably 10 to 30 nm, and dispersed in an organic solvent such as methanol, methyl ethyl ketone, methyl isobutyl ketone, propylene glycol monomethyl ether acetate, etc., is used.

Here, the average particle size means an average diameter in which particle diameters of a plural number of particles in a dispersed state before coating are measured by an electron microscopic photograph, and calculated by arithmetic mean.

The silica of the present invention can be obtained as a commercially available product, and the commercially available product may be "PL-2LPGME" (a material dispersed in propylene glycol monomethyl ether acetate with a solid content concentration of 4.15% by weight) available from Fuso Chemical Co., Ltd., etc.

The organometallic compound and the silica are used with a solid content ratio of 99:1 to 10:90 (weight ratio), preferably a ratio of 90:10 to 35:65.

Here, the solid content of the organometallic compound means an evaporation residue when the compound is evaporated to dryness at 135° C. for one hour, and is an amount which becomes an index of an amount of the organometallic compound remained on the material to be treated when the surface treatment is carried out by actually using the same.

Also, the solid content ratio means a weight ratio of the solid contents of the organometallic compound and the silica in the surface treatment agent.

For example, when an organometallic compound product which contains an organotitanium compound of 45% by weight with the solid content is used, if the organometallic compound is formulated in the metal surface treatment agent in an amount of 11.1% by weight, the solid content of the organotitanium compound becomes 11.1×0.45=4.995% by weight. On the other hand, when a product which contains the silica of 25% by weight with the solid content is used, if it is formulated in the metal surface treatment agent in an amount of 16.6% by weight, the solid content of the silica becomes 16.6×0 0.25=4.15% by weight. Thus, the solid content ratio of the organotitanium compound and the silica is 4.995:4.15=54:46.

If the silica is used with an amount larger than the solid content ratio of the organometallic compound and the silica which is more than 90%, heat resistance is lowered, peeling of adhesion is generated after heating with high temperature air. On the other hand, if the silica is used less than 1%, liquid resistance durability to water, LLC, etc., is worsened.

Also, the solid content concentrations of the organometallic compound and the silica are each adjusted to be 0.01 to 20% by weight in the metal surface treatment agent by diluting with an organic solvent. The solid content concentration is further preferably adjusted to be 0.85 to 10% by weight. If the solid content concentration is high, it leads to increase in cost, and the merit of cost effectiveness is low.

The solid content concentrations of the respective materials in the metal surface treatment agent can be obtained by the above-mentioned calculation, and according to the above-mentioned example, the solid content concentration of the organotitanium compound is 4.995% by weight, and the solid content concentration of the silica is 4.15% by weight.

In the present invention, magnesium silicate hydrate is used as a thickener, "sepiolite" available from Kusumoto Chemicals, Ltd., etc., is particularly preferably used.

As the magnesium silicate hydrate, either of the magnesium silicate hydrates of an organic modified magnesium silicate hydrate or a non-modified magnesium silicate hydrate may be used.

Here, the organic modified means a material in which the surface of the magnesium silicate hydrate is modified by using, for example, quaternary ammonium salt.

The magnesium silicate hydrate which is organic modified in the metal surface treatment agent of the present invention is preferably formulated in an amount of 4 to 19% by weight, more preferably 5 to 15% by weight, further preferably 7 to 10% by weight.

The non-modified magnesium silicate hydrate is formulated preferably in an amount of 6 to 19% by weight, more preferably 7 to 10% by weight.

If the amount of the magnesium silicate hydrate is less than 4% by weight, the viscosity is low, and there is a case where coating by screen printing becomes difficult. Also, if it exceeds 19% by weight, it becomes impossible to mix the materials in the course of preparing the metal surface treatment agent, whereby the surface treatment agent cannot be prepared.

The magnesium silicate hydrate of the present invention can be obtained as a commercially available product, and the commercially available product may be "PANGEL B20", "PANGEL B40", etc., both available from Kusumoto Chemicals, Ltd., etc.

As the organic solvent of the present invention, an organic solvent represented by the general formula (I): R—O—$(CH_2)_2OH$ is used.

In the present invention, an organic solvent in which R in the general formula (I) is an alkyl group having 3 or more carbon atoms is preferably used. R may have a substituent(s). The alkyl group R represented by R may be mentioned a propyl group, a butyl group, etc. Specific examples of the compound may be Propyl Cellosolve, Butyl Cellosolve, etc.

Also, in the present invention, an organic solvent in which R in the general formula (I) is an aryl group is preferably used. R may have a substituent(s). The aryl group represented by R may be mentioned, for example, a phenyl group, a benzyl group, a tollyl group, a xylyl group, etc. Specific examples of the compound may be mentioned Phenyl Cellosolve, etc.

It is preferred to use the organic solvent represented by the general formula (I) R—O—$(CH_2)_2OH$ [provided that, in the general formula, R represents an alkyl group having 3 or more carbon atoms or an aryl group.] since it makes coating property by screen printing good.

The organic solvent of the present invention may be used in combination of two or more kinds, and it is preferably so constituted that the organic solvent of the present invention is contained in the metal surface treatment agent in an amount of 50% by weight or more.

If the content of the organic solvent of the present invention is less than 50% by weight, there is a case where coating by screen printing becomes difficult.

As the components of the metal surface treatment agent of the present invention, a silane coupling agent may be contained other than the above.

The metal surface treatment agent of the present invention is so prepared that the solid content concentration of the whole metal surface treatment agent becomes preferably 4 to 35% by weight, further preferably 15 to 20% by weight.

Here, the solid content concentration means a concentration of an evaporation residue when the metal surface treatment agent is evaporated to dryness at 135° C. for one hour.

The viscosity of the metal surface treatment agent of the present invention measured by a B type viscometer at room temperature of 25° C. is a viscosity at 60 rpm of preferably 100 to 50,000 mPa·s, more preferably 200 to 10,000 mPa·s.

If the viscosity is less than 100 mPa·s, coating by screen printing is difficult since the viscosity is too low, while if it is a value exceeding 50,000 mPa·s, coating by screen printing is difficult since the viscosity is too high.

Also, when the ratio ($V_6/V_{60}$) of a viscosity $V_6$ at 6 rpm and a viscosity $V_{60}$ at 60 rpm is in the range of 2 to 10, the agent has a thixotropy property, so that coating property by screen printing is good.

By preparing the material as mentioned above, a metal surface treatment agent which can easily carry out coating by screen printing can be provided. The metal surface treatment agent of the present invention causes substantially no generation of bleeding, hang down, bubble, etc., when screen printing is carried out.

The following method is for preparing a rubber-metal complex by using the metal surface treatment agent comprising the respective components as mentioned above as essential components.

The metal surface treatment agent of the present invention is coated, for example, on a metal plate, preferably on a stainless steel plate subjected to an alkali degreasing treatment, by screen printing with single-sided coating weight (a film amount) of 50 to 2,500 mg/m$^2$, dried at room temperature or by warm air, and subjected to baking treatment in an oven at 100 to 300° C. for 5 to 20 minutes to prepare a rubber-metal complex.

Also, the metal surface treatment agent of the present invention is coated on a metal plate such as a stainless steel plate, etc., according to the above-mentioned method, dried, coated various kinds of adhesives for rubber, and then, bonded an unvulcanized rubber compound, etc., to carry out vulcanization under pressure and heating to prepare a rubber-metal complex.

Further, the metal surface treatment agent of the present invention is coated on a metal plate such as a stainless steel plate, etc., according to the above-mentioned method, dried, coated various kinds of adhesives for rubber, and then, coated a rubber solution in which an unvulcanized rubber compound has been dispersed in a solvent, and subjected to vulcanization, by heating under pressure depending on necessity, to prepare a rubber-metal complex.

The stainless steel plate to be used for the rubber-metal complex may be SUS301, SUS301H, SUS304, SUS430, etc. A thickness of the plate to be used is generally about 0.1 to 2 mm in the case of using it for a gasket.

When vulcanization is carried out under heating and pressure by coating various kinds of adhesives for rubber, and bonding an unvulcanized rubber compound, etc., the above-mentioned adhesive may be used by optionally selecting depending on the kind of the rubber to be adhered.

The adhesive is in general to prepare an adhesive solution by using an alcohol series organic solvent such as methanol, ethanol, isopropanol, etc., or a ketone series organic solvent such as acetone, methyl ethyl ketone, methyl isobutyl ketone, etc., singly or as a mixed solvent.

A concentration of the component of the adhesive is adjusted into the range of about 0.1 to 10% by weight, and coated with a according to the same coating method in the case of the surface treatment agent with single-sided coating weight (a film amount) of 50 to 2000 mg/m$^2$. Thereafter, drying and baking treatments are carried out under the drying conditions and baking conditions suitable for the adhesive to be used.

On the thus formed adhesive layer as mentioned above, an unvulcanized nitrile rubber compound, acrylic rubber compound, chloroprene rubber or fluororubber compound is coated as an organic solvent solution thereof.

The coated unvulcanized rubber layer is dried at room temperature to a temperature of about 100° C. for about 1 to 15 minutes, to evaporate the alcohols such as methanol, ethanol, etc., ketones such as methyl ethyl ketone, methyl isobutyl ketone, etc., aromatic hydrocarbons such as toluene, xylene, etc., or a mixed solvent thereof, etc., used as the organic solvent, then, vulcanizing under heating about at 150 to 230° C. for about 0.5 to 30 minutes, and if necessary, vulcanizing under pressure.

When the rubber solution in which the unvulcanized rubber compound is dispersed in a solvent is subjected to coating and vulcanizing to obtain a rubber-metal complex, the metal surface treatment agent of the present invention is coated on a metal plate such as a stainless steel plate, etc., and dried, then, a rubber solution prepared by dissolving the rubber composition in an organic solvent so that the solid content concentration thereof became 25% is coated thereon to prepare a rubber-metal complex.

The organic solvent which can be used for forming the rubber solution may be optionally selected depending on the rubber composition to be used and, for example, when a fluororubber composition is used as the rubber composition, ketones such as methyl ethyl ketone, di-n-propyl ketone, diisobutyl ketone, isophorone, cyclohexanone, etc., or alcohols such as methanol, ethanol, isopropanol, n-butanol, amyl alcohol, heptanol, etc., are preferably used, and it may be a ketone-alcohol mixed solvent.

The prepared rubber solution is coated on a metal plate surface after coating the metal surface treatment agent, as a one-pack type coating agent with an optional coating film thickness. For coating, a knife coater, a flow coater, a roll coater, etc., may be used. After coating, it is dried, and then, subjected to oven-vulcanization under the conditions of at about 150 to 230° C. for about 2 to 30 minutes to form a rubber-metal complex.

The rubber-metal complex thus manufactured by using the metal surface treatment agent of the present invention is water resistant and heat resistant, and shows excellent adhesiveness.

When the rubber-metal complex manufactured by using the metal surface treatment agent of the present invention is subjected to evaluation of adhesiveness according to the method conforming to the cross-cut adhesion test (JIS K 5400:1959), a rubber remaining ratio is 100% when the rubber remaining ratio of the rubber layer is confirmed with naked eyes, so that it can show excellent adhesiveness.

In addition, when the same cross-cut adhesion test is carried out after air heating under the conditions of at 200° C. for 70 hours, it shows excellent adhesiveness similarly, and even when the same cross-cut adhesion test is carried out after dipping under the conditions of in water at 100° C. and 70 hours, it can show excellent adhesiveness similarly.

EXAMPLES

Examples of the present invention are explained. The present invention is not limited by such Examples.

Example 1 <Formulation Component and Amount Thereof>

Organotitanium compound
("TC-401" available from
Matsumoto Fine Chemical Co., Ltd.;
solid content: 45%) . . . 11.1% by weight
Colloidal silica
("PL-2LPGME" available from
Fuso Chemical Co., Ltd.;
solid content: 25%) . . . 16.6% by weight
Thickener: Sepiolite
("PANGEL B20" available from
Kusumoto Chemicals, Ltd.; organic
modified magnesium silicate hydrate) . . . 7% by weight
Organic solvent:
Butyl Cellosolve ($CH_3(CH_2)_3O(CH_2)_2OH$)
("ethylene glycol monobutyl ether"
available from GODO Co., Ltd.;
boiling point: 171° C.) . . . 65.3% by weight In this Example, an organotitanium compound ("TC-401" available from Matsumoto Fine Chemical Co., Ltd., in which a titanium chelate is adjusted to 45% by an organic solvent of isopropyl alcohol was used. When the organotitanium compound is formulated with 11.1% by weight in the metal surface treatment agent, then, the solid content of the organotitanium compound becomes 11.1×0.45=4.995% by weight. On the other hand, as the silica, silica ("PL-2 LPGME" available from Fuso Chemical Co., Ltd.) in which colloidal silica is adjusted to 25% by an organic solvent of propylene glycol methyl ether acetate was used. When it is formulated with 16.6% by weight in the metal surface treatment agent, the solid content of the silica becomes 16.6×0.25=4.15% by weight. Accordingly, a solid content ratio of the organotitanium compound and the silica used in the present Example becomes 54:46.

The above-mentioned respective components were charged in a preparation tank, mixed and stirred by a stirrer, whereby a metal surface treatment agent which has been adjusted to the whole solid content concentration of 15 to 20% by weight was obtained.

With regard to the obtained metal surface treatment agent, its physical properties were evaluated according to the following methods.

<Evaluation method> The respective physical properties were measured by the following methods, and the measurement results were shown in Table 1.

(1) Viscosity By using a B type viscometer, viscosities $V_6$ and $V_{60}$ (mPa·s) at a rotation speed of the rotor at 6 rpm and at 60 rpm were measured at 25° C. Also, a viscosity ratio ($V_6/V_{60}$) of $V_6$ and $V_{60}$ was obtained to evaluate the thixotropy property.

(2) Evaluation of Coating Property by Screen Printing

The obtained metal surface treatment agent was coated on a stainless steel plate (SUS301H) by screen printing with single-sided coating weight (a film amount) of 800 mg/m$^2$, and the coating property at that time was evaluated by the following criteria:
⊚: No bleeding, hang down, bubble, etc.
○: Bleeding, hang down and bubble were generated in some extent
▸: The case where bleeding, hang down and bubble were not generated and the case where they were generated are mixed
x: Remarkable bleeding, hang down and bubble were generated (3) Evaluation of Adhesiveness The obtained metal surface treatment agent was coated on a stainless steel plate (SUS301H) by screen printing with a single-sided coating weight (a film amount) of 800 mg/m$^2$, dried at room temperature or warm air, and then, subjected to baking processing in an oven at 200° C. for 2 minutes.

Thereafter, with an unvulcanized rubber compound of a fluororubber compound comprising the following formulation composition is mixed the below mentioned vulcanization accelerator by an open roller to obtain a rubber composition, and the resulting composition is dissolved in a methyl ethyl ketone-methanol (volume ratio: 9:1) mixed solvent so that the solid content concentration thereof becomes 25% by weight by using a rotary type stirrer to prepare a rubber solution (a viscosity by a BH type viscometer with a rotor No. 4 and a rotation speed of 4 rpm: 2.5 Pa·s).

Thereafter, the above-mentioned rubber solution was coated on the stainless steel plate onto which the metal surface treatment agent has been coated. After the solvent was dried, vulcanization is carried out in an oven at 220° C. for 3 minutes to obtain a test piece as the rubber-metal complex.

<Fluororubber Compound Formulation Composition>
Fluororubber
(Viton A-200 available from
Du Pont Kabushiki Kaisha) . . . 100 parts by weight
MT carbon black (N990) . . . 20 parts by weight
White carbon (Nipsil ER available from Tosoh Silica Corporation) . . . 10 parts by weight
Magnesium oxide
(Magnesia #30 available from
Kyowa Chemical Industry Co., Ltd.) . . . 5 parts by weight
Earthy graphite (A-0 available from
Nichiden Carbon Co., Ltd.) . . . 30 parts by weight
Vulcanizing agent
(Curative #30 available from
Du Pont Kabushiki Kaisha;
bisphenol AF 50% by weight,
Fluororubber (Viton E-45)
50% by weight) . . . 10.7 parts by weight
Epoxy group-containing silane coupling agent
(SH-6040 available from
Dow Corning Toray Co., Ltd.) . . . 1.0 part by weight
Epoxy-modified phenol resin
(Epiclon N695 available from
DIC Corporation) . . . 34.5 parts by weight
<Vulcanization Accelerator>
Vulcanization accelerator
(Curative #20 available from
Du Pont Kabushiki Kaisha;
quaternary phosphonium salt: 33% by weight,
Fluororubber (Viton E-45)
67% by weight) . . . 5.8 parts by weight With regard to the test piece thus obtained, evaluation of adhesiveness was judged by the method according to the cross-cut adhesion test (JIS K 5400:1959) with five grades based on the following criteria.
<Evaluation Standard>
5 . . . A rubber remaining ratio of the rubber layer is confirmed with naked eyes, and a material with the rubber remaining ratio of 100%

4 ... A material of 95% or more and less than 100%
3 ... A material of 85% or more and less than 95%
2 ... A material of 65% or more and less than 85%
1 ... A material of less than 65%

Also, with regard to the test piece thus obtained, after subjecting to air heating under the conditions of at 200° C. for 70 hours, the same cross-cut adhesion test was carried out to evaluate heat resistance of adhesion.

Further, with regard to the test piece thus obtained, after dipping in water under the conditions of at 100° C. for 70 hours, the same cross-cut adhesion test was carried out to evaluate water resistance of adhesion.

Example 2

A metal surface treatment agent was formed in the same manner as in Example 1 except for changing an amount of the sepiolite ("PANGEL B20" available from Kusumoto Chemicals, Ltd.; organic modified) from 7% by weight to 10% by weight and changing an amount of the solvent from 65.3% by weight to 62.3% by weight, evaluated in the same manner, and the results were shown in Table 1.

Example 3

A metal surface treatment agent was formed in the same manner as in Example 1 except for changing an amount of the sepiolite ("PANGEL B20" available from Kusumoto Chemicals, Ltd.; organic modified) from 7% by weight to 5% by weight and changing an amount of the solvent from 65.3% by weight to 67.3% by weight, evaluated in the same manner, and the results were shown in Table 1.

Example 4

A metal surface treatment agent was formed in the same manner as in Example 1 except for changing an amount of the sepiolite ("PANGEL B20" available from Kusumoto Chemicals, Ltd.; organic modified) from 7% by weight to 15% by weight and changing an amount of the solvent from 65.3% by weight to 57.3% by weight, evaluated in the same manner, and the results were shown in Table 1.

Example 5

A metal surface treatment agent was formed in the same manner as in Example 1 except for changing from 7% by weight of the sepiolite ("PANGEL B20 available from Kusumoto Chemicals, Ltd.; organic modified) to 5% by weight of sepiolite ("PANGEL B40" available from Kusumoto Chemicals, Ltd.; organic modified) and changing an amount of the solvent from 65.3% by weight to 67.3% by weight, evaluated in the same manner, and the results were shown in Table 1.

Example 6

A metal surface treatment agent was formed in the same manner as in Example 1 except for changing from 7% by weight of the sepiolite ("PANGEL B20" available from Kusumoto Chemicals, Ltd.; organic modified) to 7% by weight of sepiolite ("PANGEL B40 available from Kusumoto Chemicals, Ltd.; organic modified), evaluated in the same manner, and the results were shown in Table 1.

Example 7

A metal surface treatment agent was formed in the same manner as in Example 1 except for changing from 7% by weight of the sepiolite ("PANGEL B20" available from Kusumoto Chemicals, Ltd.; organic modified) to 10% by weight of sepiolite ("PANGEL B40" available from Kusumoto Chemicals, Ltd.; organic modified) and changing an amount of the solvent from 65.3% by weight to 62.3% by weight, evaluated in the same manner, and the results were shown in Table 2.

Example 8

A metal surface treatment agent was formed in the same manner as in Example 1 except for changing from 7% by weight of the sepiolite ("PANGEL B20" available from Kusumoto Chemicals, Ltd.; organic modified) to 7% by weight of sepiolite ("PANGEL HV available from Kusumoto Chemicals, Ltd.; non-modified), evaluated in the same manner, and the results were shown in Table 2.

Example 9

A metal surface treatment agent was formed in the same manner as in Example 1 except for changing from 7% by weight of the sepiolite ("PANGEL B20" available from Kusumoto Chemicals, Ltd.; organic modified) to 10% by weight of sepiolite ("PANGEL HV" available from Kusumoto Chemicals, Ltd.; non-modified) and changing an amount of the solvent from 65.3% by weight to 62.3% by weight, evaluated in the same manner, and the results were shown in Table 2.

Example 10

A metal surface treatment agent was formed in the same manner as in Example 1 except for changing amounts of the organotitanium compound from 11.1% by weight to 22% by weight, the colloidal silica from 16.6% by weight to 0.4% by weight and the solvent from 65.3% by weight to 70.6% by weight, and evaluated in the same manner. In this case, the solid content ratio of the organotitanium compound and the silica used in Example 10 becomes 99:1. The results were shown in Table 2.

Example 11

A metal surface treatment agent was formed in the same manner as in Example 1 except for changing amounts of the organotitanium compound from 11.1% by weight to 2.2% by weight, the colloidal silica from 16.6% by weight to 36% by weight and the solvent from 65.3% by weight to 54.8% by weight, and evaluated in the same manner. In this case, the solid content ratio of the organotitanium compound and the silica used in Example 10 becomes 10:90. The results were shown in Table 2.

Example 12

A metal surface treatment agent was formed in the same manner as in Example 1 except for changing 65.3% by weight of the solvent Butyl Cellosolve ("ethylene glycol monobutyl ether" available from GODO Co., Ltd.; boiling point: 171° C.) to 65.3% by weight of Phenyl Cellosolve ($C_6H_5O(CH_2)_2OH$) ("ethylene glycol monophenyl ether" available from GODO Co., Ltd.; boiling point: 245° C.), evaluated in the same manner, and the results were shown in Table 2.

Comparative Example 1

A metal surface treatment agent was formed in the same manner as in Example 1 except for changing an amount of the sepiolite ("PANGEL B20" available from Kusumoto Chemicals, Ltd.; organic modified) from 7% by weight to 0% by weight and changing an amount of the solvent from 65.3% by weight to 72.3% by weight, evaluated in the same manner, and the results were shown in Table 3.

Comparative Example 2

A metal surface treatment agent was formed in the same manner as in Example 1 except for changing an amount of the sepiolite ("PANGEL B20" available from Kusumoto Chemicals, Ltd.; organic modified) from 7% by weight to 3% by weight and changing an amount of the solvent from 65.3% by weight to 69.3% by weight, evaluated in the same manner, and the results were shown in Table 3.

Comparative Example 3

A metal surface treatment agent was formed in the same manner as in Example 1 except for changing an amount of the sepiolite ("PANGEL B20" available from Kusumoto Chemicals, Ltd.; organic modified) from 7% by weight to 20% by weight and changing an amount of the solvent from 65.3% by weight to 52.3% by weight, evaluated in the same manner, and the results were shown in Table 3.

Comparative Example 4

A metal surface treatment agent was formed in the same manner as in Example 1 except for changing from 7% by weight of the sepiolite ("PANGEL B20" available from Kusumoto Chemicals, Ltd.; organic modified) to 5% by weight of sepiolite (PANGEL HV" available from Kusumoto Chemicals, Ltd.; non-modified) and changing an amount of the solvent from 65.3% by weight to 67.3% by weight, evaluated in the same manner, and the results were shown in Table 3.

Comparative Example 5

A metal surface treatment agent was formed in the same manner as in Example 1 except for changing from 7% by weight of the sepiolite ("PANGEL B20" available from Kusumoto Chemicals, Ltd.; organic modified) to 20% by weight of sepiolite (PANGEL HV available from Kusumoto Chemicals, Ltd.; non-modified), and changing an amount of the solvent from 65.3% by weight to 52.3% by weight, evaluated in the same manner, and the results were shown in Table 3.

Comparative Example 6

A metal surface treatment agent was formed in the same manner as in Example 1 except for changing from 7% by weight of the sepiolite ("PANGEL B20" available from Kusumoto Chemicals, Ltd.; organic modified) to 5% by weight of castor oil series thickener ("THICKENER 4040" available from SAN NOPCO Limited, 100% hydrogenated castor oil), and changing an amount of the solvent from 65.3% by weight to 67.3% by weight, evaluated in the same manner, and the results were shown in Table 3.

Comparative Example 7

A metal surface treatment agent was formed in the same manner as in Example 1 except for changing from 7% by weight of the sepiolite ("PANGEL B20" available from Kusumoto Chemicals, Ltd.; organic modified) to 7% by weight of castor oil series thickener ("THICKENER 4040" available from SAN NOPCO Limited, 100% hydrogenated castor oil), evaluated in the same manner, and the results were shown in Table 3.

Comparative Example 8

A metal surface treatment agent was formed in the same manner as in Example 1 except for changing from 7% by weight of the sepiolite ("PANGEL B20" available from Kusumoto Chemicals, Ltd.; organic modified) to 10% by weight of castor oil series thickener ("THICKENER 4040" available from SAN NOPCO Limited, 100% hydrogenated castor oil), and changing an amount of the solvent from 65.3% by weight to 62.3% by weight, evaluated in the same manner, and the results were shown in Table 3.

Comparative Example 9

A metal surface treatment agent was formed in the same manner as in Example 1 except for changing from 65.3% by weight of the solvent Butyl Cellosolve ("ethylene glycol monobutyl ether" available from GODO Co., Ltd.; boiling point: 171° C.) to 65.3% by weight of Ethyl Cellosolve ($C_2H_5O(CH_2)_2OH$) ("ethylene glycol monoethyl ether" available from GODO Co., Ltd.; boiling point: 135° C.), evaluated in the same manner, and the results were shown in Table 3.

TABLE 1

| | | | | | | | | | (% by weight) |
|---|---|---|---|---|---|---|---|---|---|
| | | | | Example 1 | Example 2 | Example 3 | Example 4 | Example 5 | Example 6 |
| Metal surface treatment agent | Organotitanium compound | | TC-401 (solid content: 45%) | 11.1 | 11.1 | 11.1 | 11.1 | 11.1 | 11.1 |
| | Colloidal silica | | PL-2L-PGME (solid content: 25%) | 16.6 | 16.6 | 16.6 | 16.6 | 16.6 | 16.6 |
| | <Solid content ratio (Organotitanium compound: Colloidal silica)> | | | 54:46 | 54:46 | 54:46 | 54:46 | 54:46 | 54:46 |
| | Thickener | Sepiolite | PANGEL B20 (organic modified) | 7 | 10 | 5 | 15 | | |
| | | | PANGEL B40 (organic modified) | | | | | 5 | 7 |
| | | | PANGEL HV (non-modified) | | | | | | |
| | | Castor oil type thickener | Thickener 4040 | | | | | | |

TABLE 1-continued

| | | | Example 1 | Example 2 | Example 3 | Example 4 | Example 5 | (% by weight) Example 6 |
|---|---|---|---|---|---|---|---|---|
| Solvent | Butyl Cellosolve | Boiling point: 171° C. | 65.3 | 62.3 | 67.3 | 57.3 | 67.3 | 65.3 |
| | Phenyl Cellosolve | Boiling point: 245° C. | | | | | | |
| | Ethyl Cellosolve | Boiling point: 135° C. | | | | | | |
| Viscosity | | mPa · s (60 rpm) | 350 | 740 | 250 | 50000 | 540 | 780 |
| | | mPa · s (6 rpm) | 1575 | 3330 | 700 | 260000 | 1836 | 3120 |
| | | V6/V60 | 4.5 | 4.5 | 2.3 | 5.2 | 3.4 | 4 |
| Evaluation of adhesion | | Initial | 5 | 5 | 5 | 5 | 5 | 5 |
| | | Heat resistance 200° C. × 70 h | 5 | 5 | 5 | 5 | 5 | 5 |
| | | Water resistance 100° C. × 70 h | 5 | 5 | 5 | 5 | 5 | 5 |
| | | Evaluation of screen coating | ◎ | ◎ | ○ | ○ | ○ | ◎ |

TABLE 2

| | | | Example 7 | Example 8 | Example 9 | Example 10 | Example 11 | (% by weight) Example 12 |
|---|---|---|---|---|---|---|---|---|
| Metal surface treatment agent | Organotitanium compound | TC-401 (solid content: 45%) | 11.1 | 11.1 | 11.1 | 22 | 2.2 | 11.1 |
| | Colloidal silica | PL-2L-PGME (solid content: 25%) | 16.6 | 16.6 | 16.6 | 0.4 | 36 | 16.6 |
| | <Solid content ratio (Organotitanium compound: Colloidal silica)> | | 54:46 | 54:46 | 54:46 | 99:1 | 10:90 | 54:46 |
| Thickener | Sepiolite | PAMGEL B20 (organic modified) | | | | 7 | 7 | 7 |
| | | PAMGEL B40 (organic modified) | 10 | | | | | |
| | | PANGEL HV (non-modified) | | 7 | 10 | | | |
| | Castor oil type thickener | Thickener 4040 | | | | | | |
| Solvent | Butyl Cellosolve | Boiling point: 171° C. | 62.3 | 65.3 | 62.3 | 70.6 | 54.8 | |
| | Phenyl Cellosolve | Boiling point: 245° C. | | | | | | 65.3 |
| | Ethyl Cellosolve | Boiling point: 135° C. | | | | | | |
| Viscosity | | mPa · s (60 rpm) | 1000 | 150 | 200 | 320 | 290 | 820 |
| | | mPa · s (6 rpm) | 4700 | 375 | 560 | 900 | 725 | 3690 |
| | | V6/V60 | 4.7 | 2.5 | 2.8 | 2.8 | 2.5 | 4.5 |
| Evaluation of adhesion | | Initial | 5 | 5 | 5 | 5 | 5 | 5 |
| | | Heat resistance 200° C. × 70 h | 5 | 5 | 5 | 5 | 5 | 5 |
| | | Water resistance 100° C. × 70 h | 5 | 5 | 5 | 5 | 5 | 5 |
| | | Evaluation of screen coating | ◎ | ○ | ○ | ○ | ○ | ○ |

TABLE 3

| | | | Comparative example 1 | Comparative example 2 | Comparative example 3 | Comparative example 4 | (% by weight) Comparative example 5 |
|---|---|---|---|---|---|---|---|
| Metal surface treatment agent | Organotitanium compound | TC-401 (solid content: 45%) | 11.1 | 11.1 | 11.1 | 11.1 | 11.1 |
| | Colloidal silica | PL-2L-PGME (solid content: 25%) | 16.6 | 16.6 | 16.6 | 16.6 | 16.6 |
| | <Solid content ratio (Organotitanium compound: Colloidal silica)> | | 54:46 | 54:46 | 54:46 | 54:46 | 54:46 |
| Thickener | Sepiolite | PANGEL B20 (organic modified) | | 3 | 20 | | |
| | | PANGEL B40 (organic modified) | | | | | |
| | | PANGEL HV (non-modified) | | | | 5 | 20 |
| | Castor oil type thickener | Thickener 4040 | | | | | |
| Solvent | Butyl Cellosolve | Boiling point: 171° C. | 72.3 | 69.3 | 52.3 | 67.3 | 52.3 |
| | Phenyl Cellosolve | Boiling point: 245° C. | | | | | |
| | Ethyl Cellosolve | Boiling point: 135° C. | | | | | |
| Viscosity | | mPa · s (60 rpm) | 10 | 50 | Mixing is impossible | 50 | Mixing is impossible |
| | | mPa · s (6 rpm) | 10 | 60 | | 115 | |
| | | V6/VS0 | 1 | 1.2 | | 2.3 | |

TABLE 3-continued (% by weight)

| | | | | Comparative example 6 | Comparative example 7 | Comparative example 8 | Comparative example 9 |
|---|---|---|---|---|---|---|---|
| Evaluation of adhesion | | Initial | | 5 | 5 | | 5 |
| | | Heat resistance 200° C. × 70 h | | 5 | 5 | | 5 |
| | | Water resistance 100° C. × 70 h | | 5 | 5 | | 5 |
| | Evaluation of screen coating | | | X | X | | X |
| Metal surface treatment agent | Organotitanium compound | | TC-401 (solid content: 45%) | 11.1 | 11.1 | 11.1 | 11.1 |
| | Colloidal silica | | PL-2L-PGME (solid content: 25%) | 16.6 | 16.6 | 16.6 | 16.6 |
| | <Solid content ratio (Organotitanium compound: Colloidal silica)> | | | 54:46 | 54:46 | 54:46 | 54:46 |
| | Thickener | Sepiolite | PANGEL B20 (organic modified) | | | | 7 |
| | | | PANGEL B40 (organic modified) | | | | |
| | | | PANGEL HV (non-modified) | | | | |
| | | Castor oil type thickener | Thickener 4040 | 5 | 7 | 10 | |
| | Solvent | Butyl Cellosolve | Boiling point: 171° C. | 67.3 | 65.3 | 62.3 | |
| | | Phenyl Cellosolve | Boiling point: 245° C. | | | | |
| | | Ethyl Cellosolve | Boiling point: 135° C. | | | | 65.3 |
| Viscosity | | | mPa · s (60 rpm) | 100 | 350 | 740 | 500 |
| | | | mPa · s (6 rpm) | 440 | 1575 | 3330 | 2250 |
| | | | V6/VS0 | 2.2 | 4.5 | 4.5 | 4.5 |
| Evaluation of adhesion | | Initial | | 5 | 5 | 5 | 5 |
| | | Heat resistance 200° C. × 70 h | | 5 | 5 | 5 | 5 |
| | | Water resistance 100° C. × 70 h | | 1 | 1 | 1 | 5 |
| | Evaluation of screen coating | | | Δ | ○ | 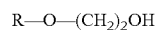 | X |

<Evaluation> When Example 1 and Comparative example 9 are compared to each other, it can be understood that coating property by screen printing is markedly worsened since the carbon number of the alkyl group represented by R in the general formula (I) is less than 3 when Ethyl Cellosolve which is an organic solvent represented by $C_2H_5$—O—$(CH_2)_2OH$ is formulated in an amount of 50% by weight or more. This can be considered that a low boiling point would be affected as compared with that of the organic solvent in which the carbon number of the alkyl group represented by R in the general formula (I) is 3 or more.

When Examples 1, 2 and 3 and Comparative examples 6, 7 and 8 are compared to each other, it can be understood that the coating property by screen printing can be solved by formulating a large amount of a castor oil series thickener as 7 to 10% by weight in place of using magnesium silicate (sepiolite) as a thickener, but its water resistance of the adhesion is inferior when the rubber-metal complex is formed.

With regard to the amount of the organic modified sepiolite, when Examples 1, 2, 3 and 4 and Comparative examples 1, 2 and 3 are compared to each other, it can be understood that if the amount of the organic modified sepiolite is less than 4% by weight, a viscosity is too low so that screen printing could not be carried out, while if it exceeds 19% by weight, the metal surface treatment agent itself cannot be mixed, whereby it cannot be utilized as a metal surface treatment agent.

With regard to the amount of the inorganic modified sepiolite, when Examples 8 and 9 and Comparative examples 4 and 5 are compared to each other, it can be understood that if the amount of the non-modified sepiolite is less than 6% by weight, a viscosity is too low so that screen printing could not be carried out, while if it exceeds 19% by weight, the metal surface treatment agent itself cannot be mixed, whereby it cannot be utilized as a metal surface treatment agent.

From the results as mentioned above, it could be certified that the metal surface treatment agent according to the present invention has good coating property by screen printing, and the rubber-metal complex prepared by using the metal treatment agent of the present invention is excellent in water resistance and heat resistance, and the adhesiveness is not vulnerable to the external environment.

The invention claimed is:

1. A metal surface treatment agent for coating a metal surface to be coated with rubber compound, the metal surface treatment agent comprises an organotitanium compound, silica, magnesium silicate hydrate and an organic solvent represented by the following general formula (I): and the magnesium silicate hydrate is an organic modified magnesium silicate, and the organic modified magnesium silicate is contained in an amount of 4 to 19% by weight based on a total weight of starting reagents;

$$R\text{—}O\text{—}(CH_2)_2OH \qquad \text{General formula (I)}$$

wherein R is selected from the group consisting of a propyl, a butyl, a phenyl, a benzyl, a tollyl and a xylyl, and wherein the organic solvent is contained in an amount of 50% to 70% by weight based on a total weight of starting reagents, and wherein the metal surface treatment agent has a viscosity measured at a temperature of 25° C. using a B type viscometer at 60 rpm of 100 mPas or more.

2. The metal surface treatment agent according to claim 1, wherein solid content concentrations of the organotitanium compound and the silica are both 0.01 to 20% by weight.

3. The metal surface treatment agent according to claim 1, wherein the solid content concentration of the metal surface treatment agent is 4 to 35% by weight.

4. The metal surface treatment agent according to claim 1, wherein the metal surface treatment agent has a viscosity ratio $V_6/V_{60}$ which is a ratio of the viscosity $V_6$ at 6 rpm to a viscosity $V_{60}$ at 60 rpm is in the range of 2-10.

5. A metal surface treatment agent for partially coating a surface by screen printing, the metal surface treatment agent comprises an organotitanium compound, silica, an organic modified magnesium silicate hydrate thickener present in an amount of 4 to 19% by weight based on a total weight of starting reagents, and an organic solvent present in an amount of 50% to 70% by weight based on a total weight of starting reagents, the organic solvent represented by the following general formula (I):

$$R\text{—}O\text{—}(CH_2)_2OH \qquad \text{General formula (I)}$$

wherein R is selected from the group consisting of a propyl, a butyl, a phenyl, a benzyl, a tollyl and a xylyl, wherein the solid content concentration of the metal surface treatment agent is 4 to 35% by weight, and wherein the metal surface treatment agent has a viscosity measured at a temperature of 25° C. using a B type viscometer at 60 rpm of 100 mPas or more.

* * * * *